(12) United States Patent  
Hembree et al.

(10) Patent No.: US 7,101,158 B2
(45) Date of Patent: Sep. 5, 2006

(54) HYDRAULIC BALANCING MAGNETICALLY DRIVEN CENTRIFUGAL PUMP

(75) Inventors: Richard D. Hembree, Bellingham, WA (US); Francis Dupuis, Spring Hill, FL (US)

(73) Assignee: Wanner Engineering, Inc., Minneapolis, MN (US)

( * ) Notice: Subject to any disclaimer, the term of this patent is extended or adjusted under 35 U.S.C. 154(b) by 233 days.

(21) Appl. No.: 10/751,259

(22) Filed: Dec. 30, 2003

(65) Prior Publication Data

US 2005/0142003 A1 Jun. 30, 2005

(51) Int. Cl.
*F04B 17/00* (2006.01)

(52) U.S. Cl. ........................................ 417/420; 417/53
(58) Field of Classification Search ................ 417/420, 417/53
See application file for complete search history.

(56) References Cited

U.S. PATENT DOCUMENTS

| | | | |
|---|---|---|---|
| 4,013,384 A * | 3/1977 | Oikawa | 417/368 |
| 4,047,847 A | 9/1977 | Oikawa | |
| 4,226,574 A | 10/1980 | Villette | |
| 4,793,777 A | 12/1988 | Hauenstein | |
| 4,871,301 A * | 10/1989 | Buse | 417/420 |
| 5,201,642 A | 4/1993 | Hinckley | |
| 5,464,333 A | 11/1995 | Okada et al. | |
| 5,641,275 A * | 6/1997 | Klein et al. | 417/420 |
| 5,779,456 A | 7/1998 | Bowes et al. | |
| 5,895,203 A | 4/1999 | Klein | |
| 5,961,301 A | 10/1999 | Wasserman et al. | |
| 5,997,264 A | 12/1999 | Klein et al. | |
| 6,012,909 A * | 1/2000 | Sloteman et al. | 417/366 |
| 6,135,728 A | 10/2000 | Klein et al. | |
| 6,234,748 B1 | 5/2001 | Brown et al. | |
| 6,264,440 B1 | 7/2001 | Klein et al. | |
| 6,293,772 B1 | 9/2001 | Brown et al. | |
| 6,443,710 B1 | 9/2002 | Tatsukami et al. | |
| 6,607,370 B1 * | 8/2003 | Fukamachi et al. | 417/420 |

* cited by examiner

*Primary Examiner*—Charles G. Freay
(74) *Attorney, Agent, or Firm*—Merchant & Gould P.C.

(57) ABSTRACT

A magnetically driven pump includes a casing, a containment shell fixed to the casing, a shaft fixed at a closed end of the containment shell, an impeller rotatable about the shaft within the casing and containment shell, and a magnetic coupling removably secured to the impeller and rotatable about the shaft. The pump also includes a rear bearing positioned between the propeller and the shaft that is rotatable about the shaft, and a thrust control valve that includes a thrust ring positioned between the containment shell and the rear bearing. An opening of the thrust control valve is defined by a variable spacing between the thrust ring and the rear bearing.

23 Claims, 9 Drawing Sheets

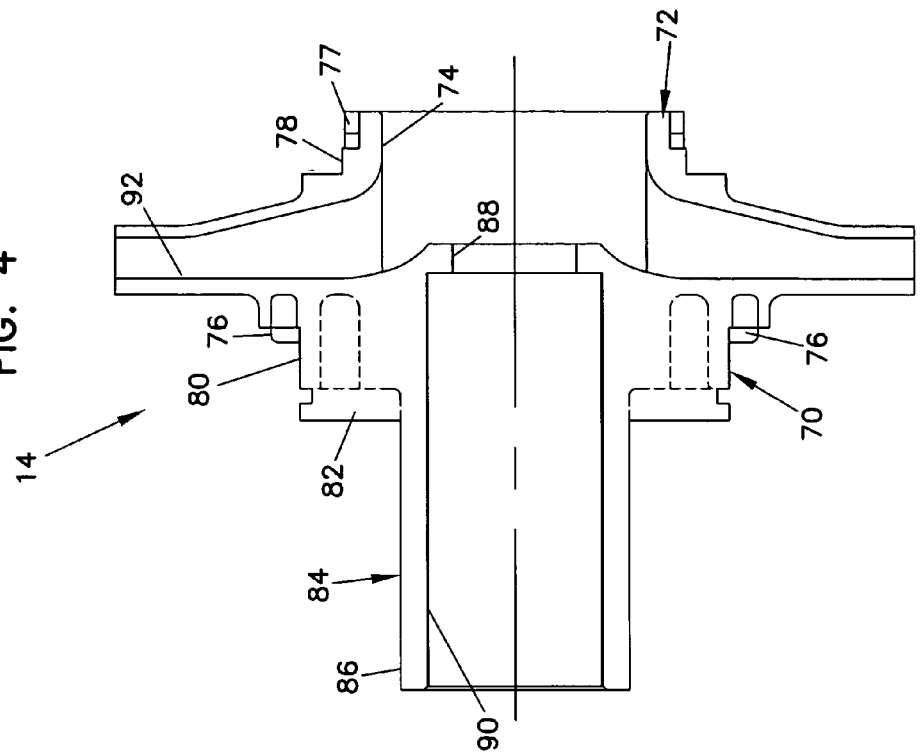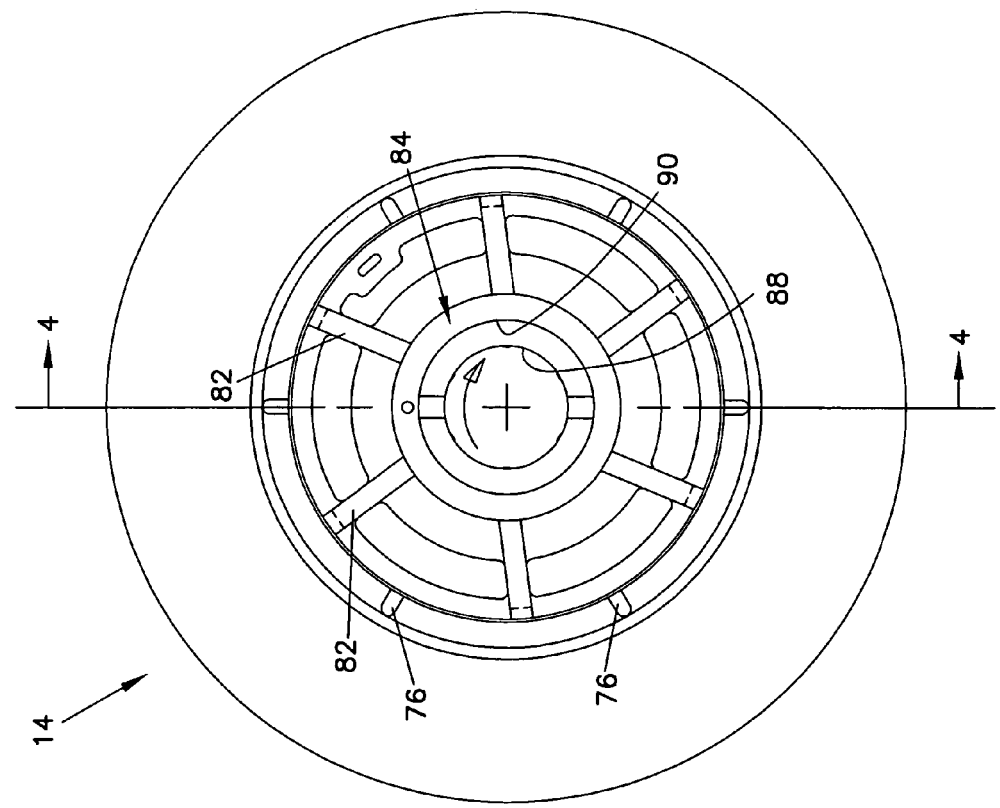

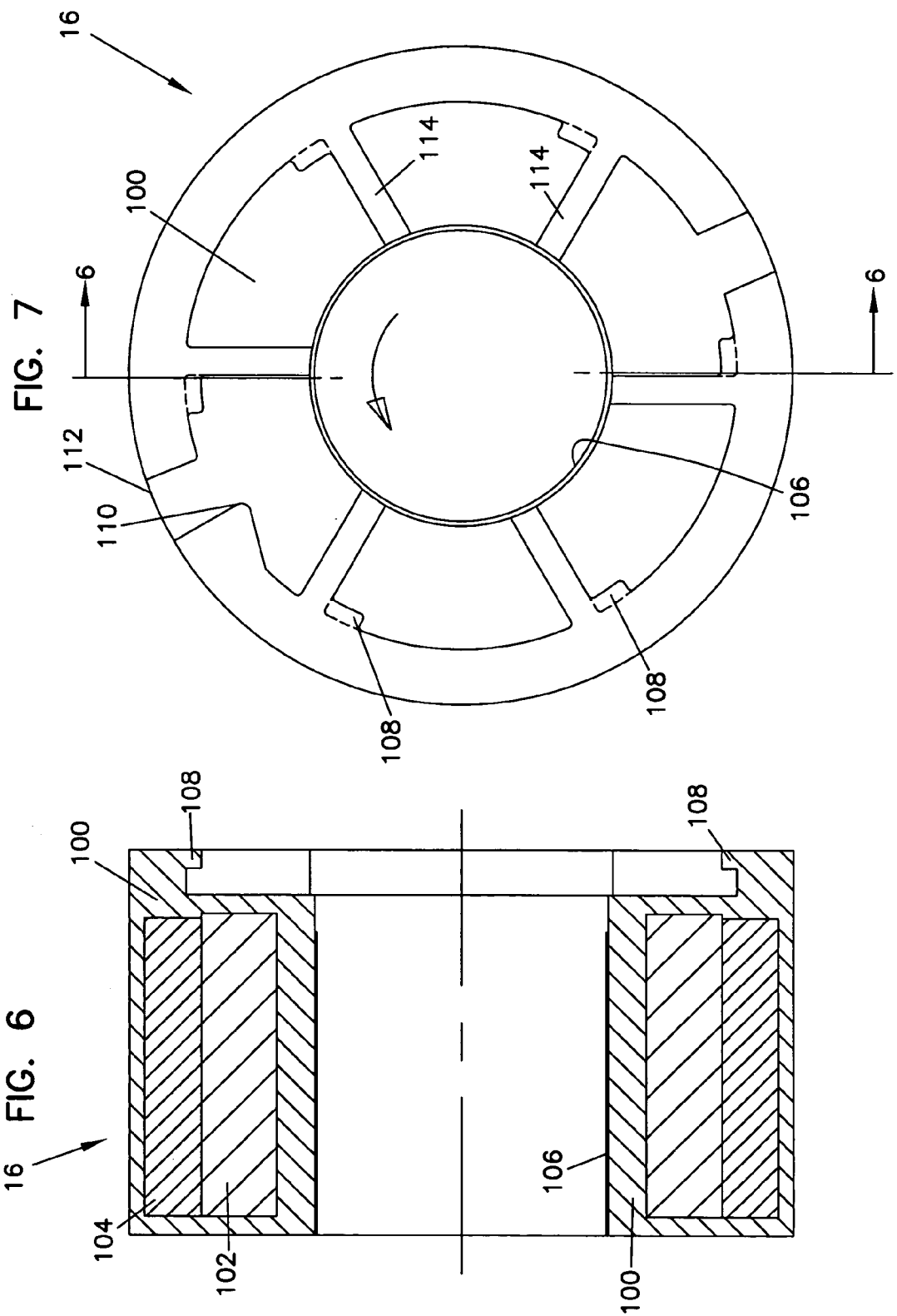

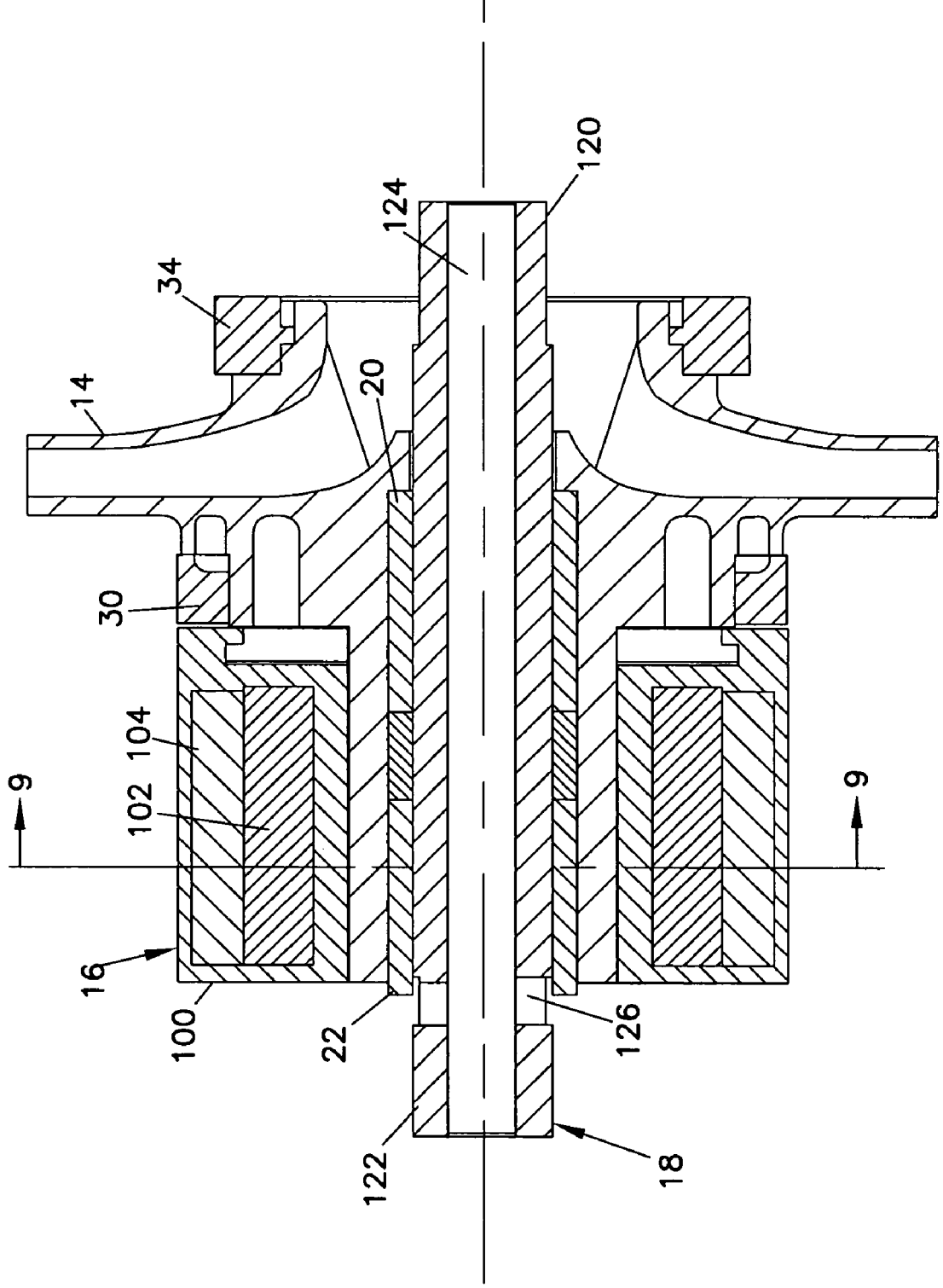

HYDRAULIC BALANCING MAGNETICALLY DRIVEN CENTRIFUGAL PUMP

BACKGROUND OF THE INVENTION

1. Field of the Invention

The present invention generally relates to fluid pumps and more specifically relates to magnetically driven centrifugal pumps.

2. Related Art

Magnetically driven centrifugal pumps are well suited for pumping corrosive or hazardous fluids because they do not have shaft seals that can leak or wear out. Pumps of this type require some method of opposing the thrust load that is created by the impeller. Typically this load is taken by an axial bearing as described in U.S. Pat. No. 4,226,574. To accommodate periodic load opposite to the normal direction that occur in certain pumping conditions, an additional axial bearing containment shell be used as described in U.S. Pat. No. 6,443,710. Another method of opposing these axial loads is by using a thrust balancing system such as that described in by Klein in U.S. Pat. No. 6,135,728. Klein uses fluid pressure to balance the thrust forces and controls the fluid pressure with a ring on the impeller hub that creates a variable gap between the ring and the shaft.

There is an inherent difficulty in controlling the thrust forces with a thrust balancing valve. Since pumps need to operate over a wide range of pressures and flows, a thrust-balancing valve must also be able to control the pressure over a wide range of pressures. In order to achieve this type of control, a pressure differential must always exist across the valve. Therefore, there is a need to achieve the lowest possible pressure on the outlet side of the valve, while also maintaining the highest possible static pressure on the back side of the valve.

Rotation of the fluid in the area that is used to balance the thrust forces creates a pressure gradient that reduces the pressure differential across the thrust balancing valve. Klein requires that the fluid travel through channels in the rotating impeller to get to the thrust balancing valve. These rotating passages contribute to the lack of available pressure at the back side of the valve.

Another problem that is typical for magnetically driven pumps in general is the need to provide different impeller sizes. Since the impeller is typically permanently attached to the magnet carrier, the cost of the assembly is relatively high. This means that spare parts or alternate impellers that need to be stocked become a much more expensive inventory. Even when these components are made separately, they are typically secured together in a manner that is not easily disassembled (e.g., the attachment structure disclosed in U.S. Pat. No. 5,895,203). Therefore there is a need for an impeller and magnet carrier that be easily separated, but can still transmit the required torque.

Another aspect of magnetically driven pumps is the need to periodically replace wear rings. Although removable wear rings are described in U.S. Pat. No. 6,234,748, they require separate retainer rings that are not easily removed. A need exists for a simple means of replacing wear rings without retaining rings.

SUMMARY OF THE INVENTION

The present invention generally relates to fluid pumps and more specifically relates to magnetically driven centrifugal pumps. One aspect of the invention relates to a thrust control valve that control pressure within the pump to balance axial impeller loads. An opening of the valve is defined by a rear bearing of the pump and a thrust ring that are located at a closed end of a containment shell of the pump where an end of the shaft is fixed. A stator positioned at the closed end of the containment shell provides a static fluid condition so that fluid entering into the valve is not rotating. The fluid within the central fluid channel of the shaft exits into a primary fluid flow of the pump preferably in a direction substantially perpendicular to the primary fluid flow so that a low pressure venturi effect is created.

Another aspect of the invention relates to a stator that includes a plurality of static radial vanes positioned in an inner volume of the containment shell near the closed end of the containment shell. The vanes of the stator oppose rotation of fluid in the closed end of the containment vessel, which may provide increased pressure at the entrance of the valve. Another aspect of the invention relates to a pressure port located on the front side of the impeller hub that further assists in balancing pressure forces in the pump. Another aspect of the invention relates to an attachment mechanism for securing the magnetic carrier of the pump to the impeller. The attachment mechanism provides for releasability of the magnet carrier while providing resistance to torque in either rotated direction. A still further aspect of the invention relates to an attachment and locking mechanism for securing wear rings of the pump at various locations relative to the impeller and casing of the pump.

A magnetically driven pump according to principles of the invention includes a casing, a containment shell fixed to the casing, a shaft fixed at a closed end of the containment shell, an impeller rotatable about the shaft within the casing and containment shell, and a magnetic coupling removably secured to the impeller and rotatable about the shaft. The pump also includes front and rear bearings positioned between the impeller and the shaft that are rotatable about the shaft, and a rear thrust valve that includes a rear thrust ring positioned between the containment shell and the rear bearing. An opening of the thrust control valve is defined by a variable spacing between the rear thrust valve and the rear bearing.

Another aspect of the invention relates to a magnetically driven pump that includes a containment shell having a closed end and an open end and defining an inner volume, a shaft fixed at the closed end of the containment shell within the interior volume, and a stator secured at the closed end of the containment shell and including at least one vane extending from an axis of the shaft into the interior volume in a generally radial direction.

Another aspect of the invention relates to a magnetically driven pump that includes a fixed shaft having an internal channel, and an impeller having a fluid channel defining a direction of primary fluid flow and an impeller hub having a shaft bore. The shaft bore of the impeller is sized to receive bearings and the fixed shaft of the pump. The impeller hub includes a fluid inlet that is in fluid communication with the internal channel of the fixed shaft and a fluid outlet that directs the fluid flowing out of the internal channel of the shaft into the primary fluid flow.

A still further aspect of the invention relates to a magnetically driven pump that includes a casing, an impeller rotatable within the casing, a containment shell, and first and second wear rings. The containment shell includes an open end, a closed end, and an attachment flange extending radially from the open end of the containment shell. The attachment flange is configured to be secured to the casing and includes a first wear ring seat. The first wear ring is releasably secured to the containment shell wear ring seat, and the second wear ring is releasably secured to the impeller in alignment with the first wear ring.

A still further aspect of the invention relates to a method of balancing a magnetically driven pump that includes a containment shell having a front end and a rear end, a shaft including an internal channel and being fixed to the rear end of the containment shell, a magnetic coupling rotatable about the shaft within the containment shell, front and rear bearings positioned between the magnetic coupling and the shaft that are rotatable relative to the shaft, and a thrust control valve that includes a thrust ring and a valve opening having a size defined by a relative position between the rear bearing and the thrust ring. Steps in the method may include positioning the thrust control valve at the rear of the containment shell between the containment shell and the rear bearing, increasing fluid pressure in the containment shell thereby moving the rear bearing axially away from the thrust ring to increase the size of an opening of the thrust control valve opening, moving the fluid through the valve opening into the internal channel of the shaft thereby decreasing pressure in the containment shell, and moving the rear bearing axially toward the thrust ring as the pressure in the containment shell decreases to balance pressure forces in the pump.

BRIEF DESCRIPTION OF THE DRAWINGS

FIG. 4 is a cross-sectional side view of the impeller shown in FIG. 1;

FIG. 5 is a front view of the impeller shown in FIG. 4;

FIG. 6 is a cross-sectional side view of the inner magnet assembly shown in FIG. 1;

FIG. 7 is a front view of the inner magnet assembly shown in FIG. 6;

FIG. 8 is a cross-sectional rear view of a subassembly of the pump shown in FIG. 1 that includes the inner magnet assembly, the impeller, and inner wear rings;

DETAILED DESCRIPTION OF THE PREFERRED EMBODIMENT

Figure 1:
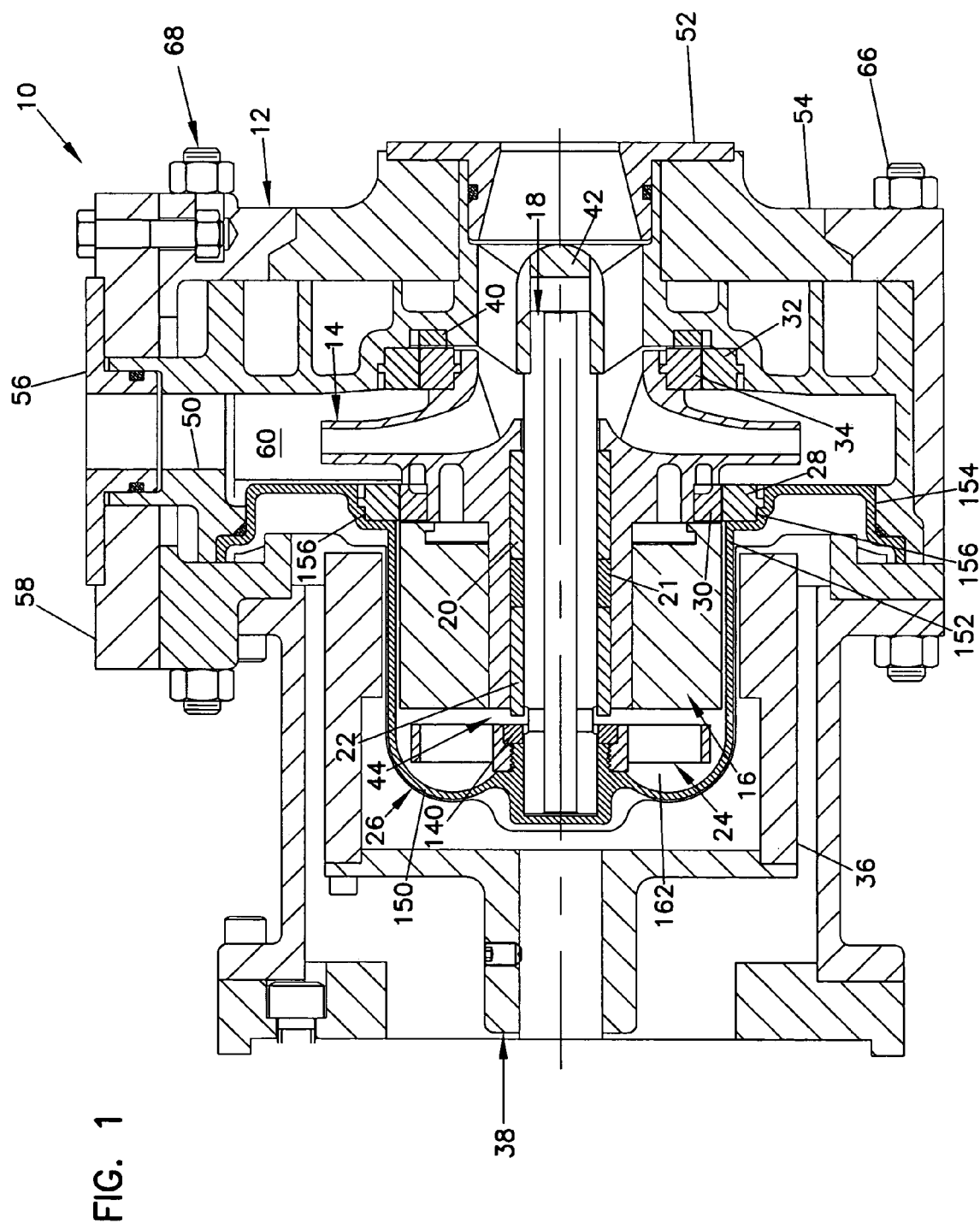
FIG. 1 is a cross-sectional side view of an example magnetically driven centrifugal pump according to principles of the present invention.

The present invention generally relates to fluid pumps and more specifically relates to magnetically driven centrifugal pumps. One aspect of the invention relates to a thrust control valve that controls pressure within the pump to balance axial impeller loads. The thrust control valve includes a portion of a rear bearing of the pump and a thrust ring that are located at a closed end of a containment shell of the pump where an end of the shaft is fixed. Fluid passing through the thrust control valve enters a central fluid channel of the shaft and exits the central fluid channel into a primary fluid flow of the pump. Because the shaft maintains a fixed position, the fluid passing through the central fluid channel may travel without rotating, thus increasing the pressure differential across the thrust control valve.

Another aspect of the invention relates to a stator that includes a plurality of static radial vanes positioned in an inner volume of the containment shell near the closed end of the containment shell. The vanes of the stator oppose rotation of fluid in the closed end of the containment vessel, which may provide increased pressure at the entrance of the thrust control valve. Another aspect of the invention relates to an attachment mechanism for securing the magnetic carrier of the pump to the impeller. The attachment mechanism provides for releasability of the magnet carrier while providing resistance to torque in either rotated direction. A still further aspect of the invention relates to an attachment and locking mechanism for securing wear rings of the pump at various locations relative to the impeller and casing of the pump.

An example magnetically driven centrifugal pump assembly 10 that includes features of the present invention is described with reference to FIGS. 1–12. First referring to the cross-sectional view of FIG. 1, pump assembly 10 includes a casing 12, an impeller 14, an inner magnet assembly 16, a shaft 18, front and rear bearings 20, 22, a stator 24, and a containment shell 26. Pump assembly 10 also includes an outer rear wear ring 28, an inner rear wear ring 30, an outer front wear ring 32, and an inner front wear ring 34. In operation, a hub motor 38 powers an outer magnet assembly 36 thereby causing rotation of the impeller 14 within casing 12 due to a magnetic response in the inner magnet assembly 16. Pump assembly 10 also includes a thrust washer 40 positioned adjacent front wear rings 32, 34, a fluid return 42, and a thrust control valve 44. The thrust control valve 44 (see FIG. 3) along with other features of pump assembly 10 provide a pressure balancing effect within casing 12 that reduces thrust forces and wear.

Casing 12 includes a main casing 50 providing a casing fluid channel 60 therethrough, a suction flange 52 and related suction flange support 54, and a discharge flange 56 and related discharge flange support 58. When casing 12 is assembled and secured together with studs 66, 68 and other casing support members (not identified), the pump assembly 10 is sealed except for the intended flow paths for fluid moving through the suction and discharge flanges 52, 56.

Referring now to FIGS. 4 and 5, impeller 14 includes an impeller hub 70, an impeller shroud 72 having a shroud opening 74, inner rear wear ring drive lugs 76, inner front wear ring drive lugs 77, an inner front wear ring seat 78, an inner rear wear ring seat 80, and a plurality of drive ribs 82. A rear body 84 of impeller 14 includes an outer surface 86, and a front bore 88, rear bore 90, and primary fluid flow channels 92.

The inner rear wear ring drive lugs 76 and inner rear wear ring seat 80 are configured to engage the inner rear wear ring 30. The inner front wear ring seat 78 and inner front wear ring lugs 77 engage and retain the inner front wear ring 34 (see FIG. 8). The drive ribs 82 are configured to engage and retain the inner magnet assembly 16 to the impeller 14 (see FIG. 8). The rear bore 90 of rear body 84 is sized to receive the front and rear bearings 20, 22 and a spacer 21 that separates the bearings.

Referring now to FIGS. 6 and 7, inner magnet assembly 16 includes a magnet housing 100, a magnet core 102, a plurality of magnets 104 (see FIG. 9), a bore 106, a plurality of locking tabs 108, a locking flange 110, a locking tab access 112, and a plurality of drive vanes 114. The locking tabs 108 are sized to engage features of the drive ribs 82 (see FIG. 4) of the impeller to secure the impeller 14 and inner magnet assembly 16 together with a twist lock attachment. The locking flange 110 further secures impeller 14 and inner magnet assembly 16 together and prevents a reversing rotation of inner magnet assembly 16 relative to an impeller 14 that would otherwise disengage locking tabs 108 from drive ribs 82 of the impeller. The locking tab access 112 provides access to the locking flange 110. The magnets 104 are embedded in magnet housing 100. The bore 106 is sized to receive the rear body 84 of impeller 14 (see FIG. 4).

Figure 9:
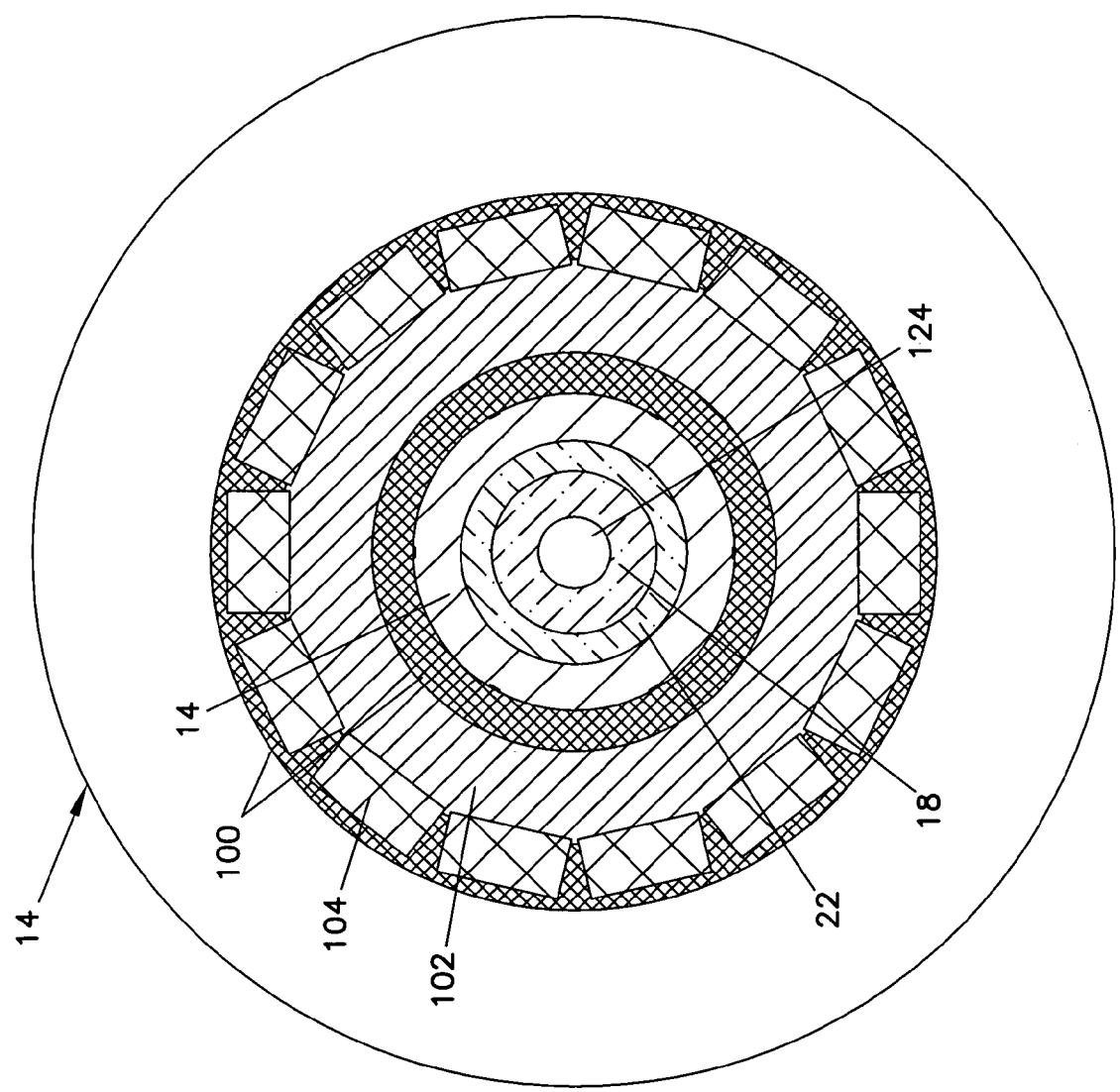
FIG. 9 is a rear cross-sectional view of the subassembly shown in FIG. 8.

FIG. 9 shows the magnet assembly 16 having fourteen separate magnets that are secured to magnet core 102 and embedded within magnet housing 100. Other embodiments may include as few a single magnet or may include more than fourteen magnets in order to optimize performance of the pump assembly 10. Further, the different locking tabs, flanges, accesses and drive vanes shown in the Figures are merely exemplary and could be replaced with any suitable locking or engagement features.

Figure 2:
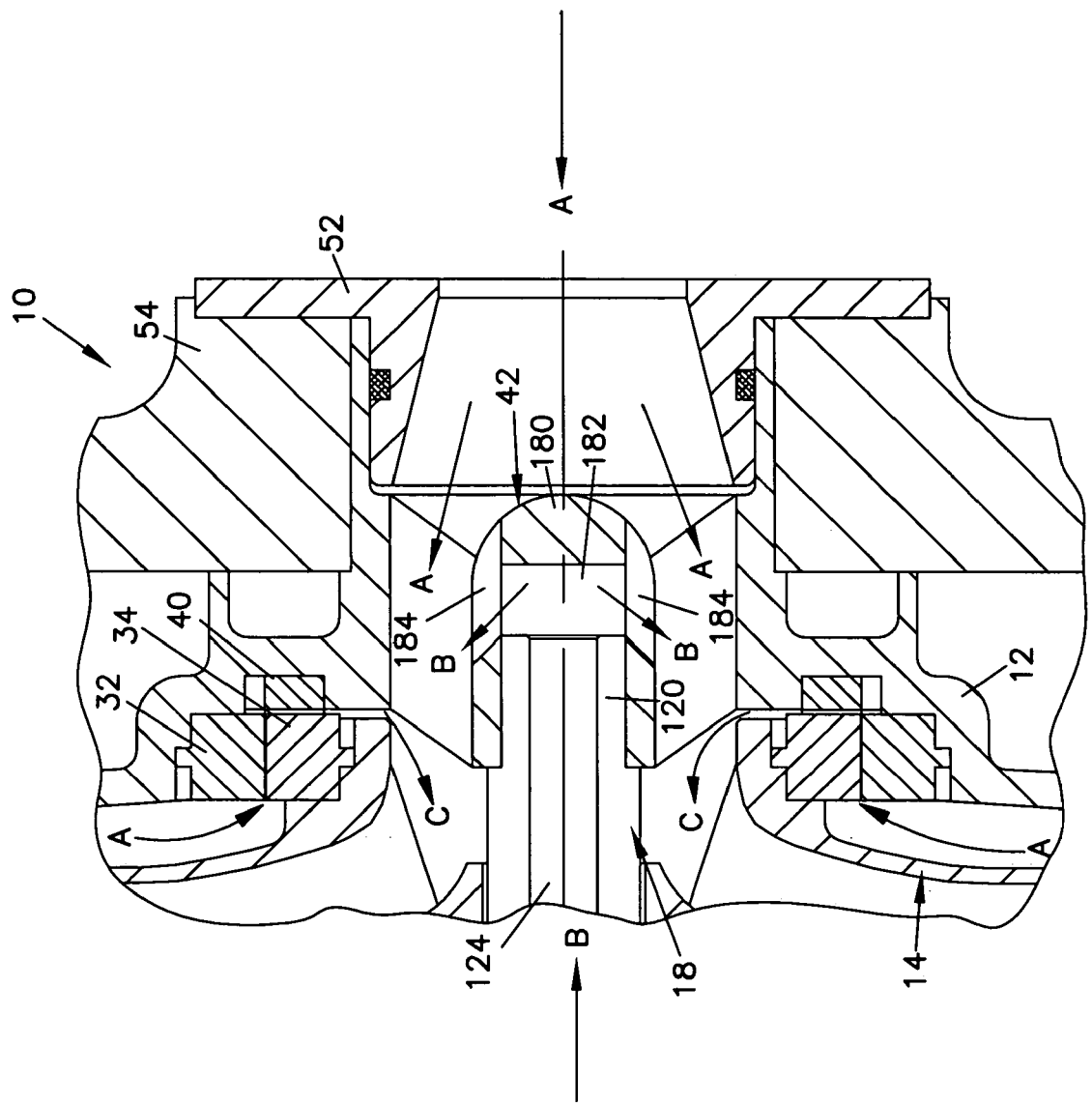
FIG. 2 is a partial close up view of the pump shaft, the impeller, and the front wear rings shown in FIG. 1.
Figure 3:
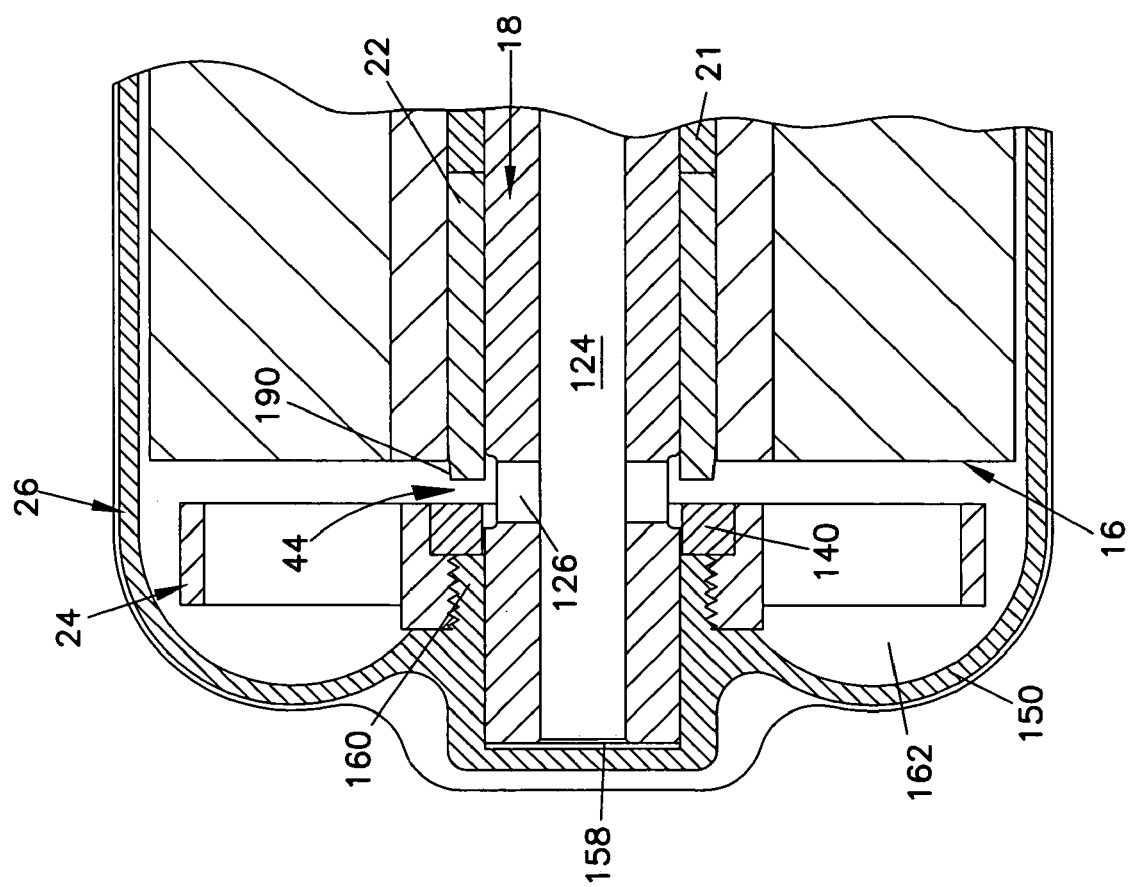
FIG. 3 is a partial close up view of the thrust control valve and stator shown in FIG. 1.

Referring now to FIGS. 2, 3, and 8, the shaft 18 includes front and rear ends 120, 122, an internal channel 124 preferably extending coaxial with an axis of the shaft, and a transverse port 126 providing fluid communication between an exterior of the shaft and the internal channel 124. The front end 120 of shaft 18 is sized to engage the fluid return 42. Return 42 includes a leading end 180, a central open core 182, and side openings 184. When return 42 is coupled to front end 120 of the shaft 18, the internal channel 124 of the shaft is in fluid communication with the central core 182. Return 42 is further configured to discharge fluid from core 182 through side openings 184 into primary fluid flow A through pump assembly 10 preferably in the direction of flow of the primary fluid flow A. The leading end 180 may have a variety of different configurations to facilitate flow around the front end 120 of shaft 18.

Figure 10:
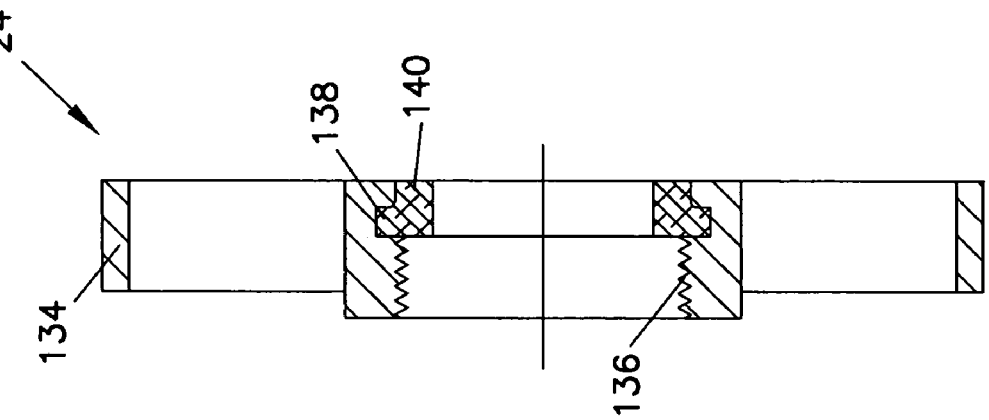
FIG. 10 is a cross-sectional side view of the stator shown in FIG. 1.
Figure 11:
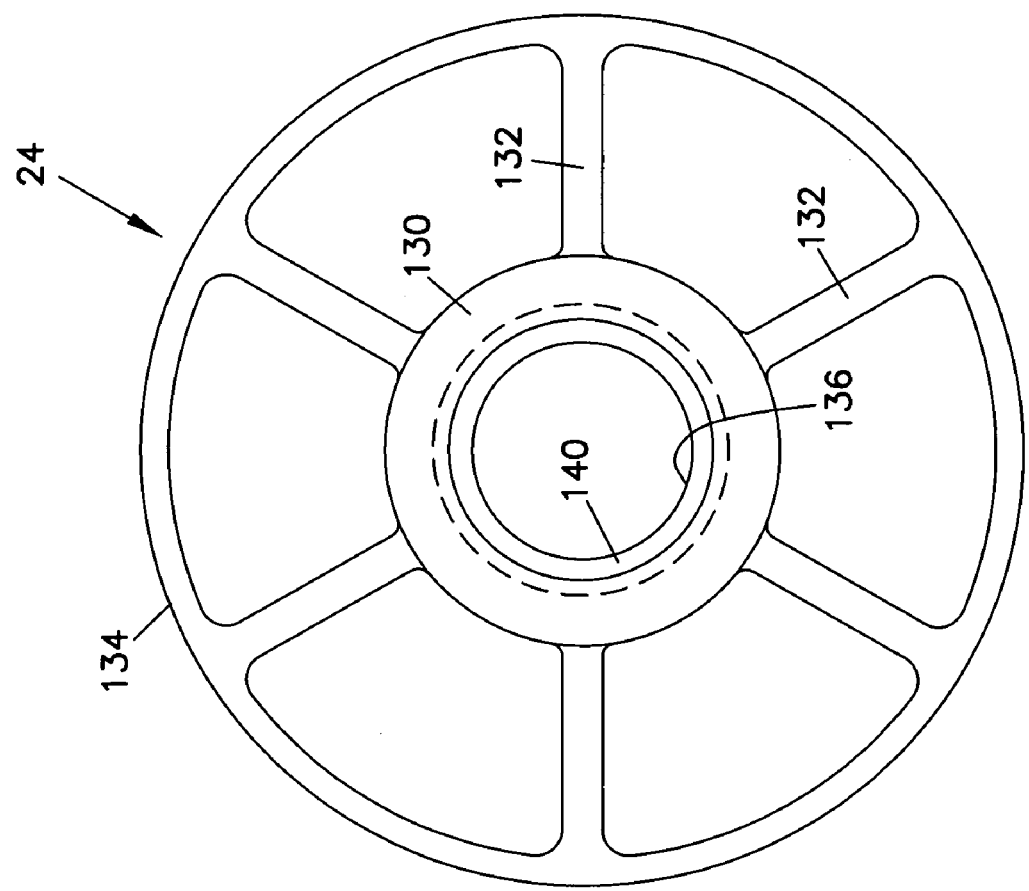
FIG. 11 is a front view of the stator shown in FIG. 10.

Referring now to FIGS. 10 and 11, the stator 24 includes a hub 130, a plurality if radial vanes 132, an outer ring 134, a threaded bore 136, a thrust ring seat 138, and a thrust ring 140. The thrust ring 140 may be removably secured to hub 130 or may be molded into hub 130 so that the thrust ring is an integral piece with the remaining stator features as shown in FIGS. 10 and 11. Some advantages of a stator with radially extended vanes that are separate from the containment shell are discussed below.

Figure 12:
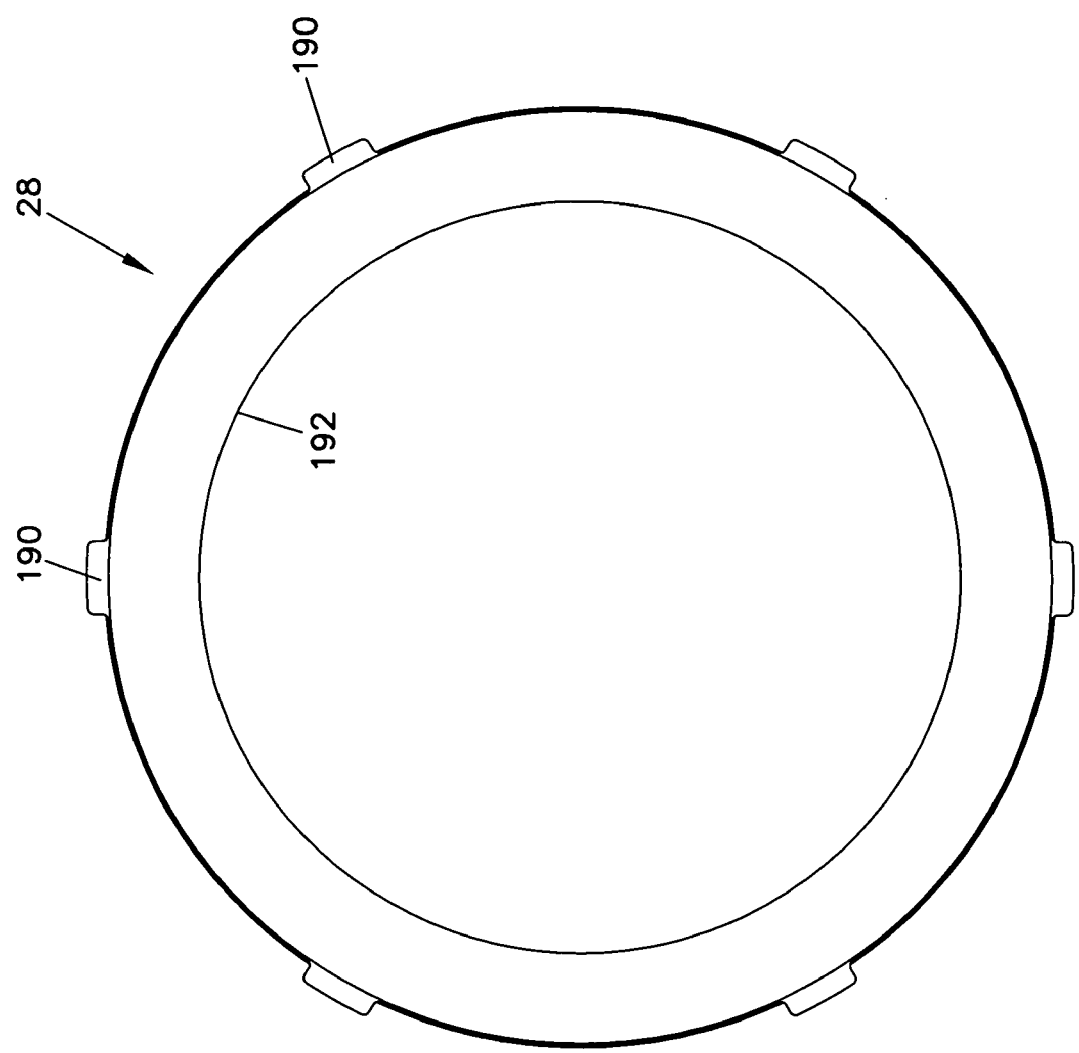
FIG. 12 is a front view of the outer rear wear ring shown in FIG. 1.

Referring now to FIGS. 1 and 3, the containment shell 26 includes a closed rear end 150, and open front end 152, an attachment flange 154 extending from front end 152, an outer rear wear ring seat 156, a shaft seat 158, and a stator connection hub 160. The containment shell 26 defines an inner volume 162 that is sized to receive the stator 24 and subassembly of components shown in FIGS. 8 and 9. The wear ring seat 156 is configured to retain outer rear wear ring 28 to the containment shell 26. An example outer rear wear ring 28 is shown in FIG. 12, and includes a plurality of lock tabs 190 that are sized to engage retaining features (not shown) in wear ring seat 156 that are similar to the locking tabs 108 shown in FIGS. 6 and 7.

Referring now to FIGS. 3 and 10, stator 24 includes a threaded bore 136 that is configured to engage the stator connection hub 160. The hub 160 includes threads on an outer surface sized to engage the threaded bore 136 of the stator. In other embodiments, the stator may be mounted to the stator connection hub 160 with other attachment configurations such as a keyed slot, a bore with matching planar faces, a set screw, or any other suitable connection means.

When the pump assembly 10 is assembled, the rear outer and inner wear rings 28, 30 are aligned with each other and the front outer and inner wear rings 32, 34 are aligned with each other. Further, the rear end 190 of the rear bearing 22 is positioned adjacent the thrust ring 140 of the stator 24. In addition, the thrust washer 40 is in alignment with a front surface of the inner front wear ring 34. The thrust washer 40 and thrust ring 140 are used to control axial thrust in both axial directions during conditions where the thrust is not balanced with pressure, such as at startup. The interface and relative spacing between these features that are aligned with each other are important for the balancing of thrust forces within pump assembly 10 as described below.

When in use, pumpage (fluid flowing through pump assembly 10) enters the pump assembly 10 at the suction flange 52 and passes into the impeller 14 as fluid flow A. After passing through the impeller, the pumpage flows into the casing fluid channel 60 where it collects and is guided out of the pump assembly 10 through the discharge flange 56. Some of the pumpage collected in casing fluid channel 60 passes between the pairs of case rings 28, 30, and 32, 34. Pumpage passing between case rings 28, 30 collects in the inner volume 162 of containment shell 26. As pressure builds within the inner volume 162, the sub-assembly shown in FIGS. 8 and 9 without the shaft 18 (hereinafter referred to as "impeller/magnet subassembly") begins to move axially in the containment shell 26 away from the rear end 150 of the containment shell. As the impeller/magnet subassembly begins to move, the thrust control valve 44 begins to open for the passage of fluid from the inner volume 162 into the internal channel 124 of shaft 18 via the transverse port 126. As fluid flows through the thrust control valve 44, the pressure behind the impeller 14 within the inner volume 162 decreases and the impeller moves axially back toward the rear end 150 of the containment shell 26 closing the space between the thrust ring 140 and rear bearing 22. The thrust control valve 44 closes to a point where equilibrium is reached between the pressure forces within the inner volume 162 and forces on impeller 14 outside the containment shell 26. This equilibrium point is preferably at a point where the thrust ring 140 and rear bearing 22 are not touching each other and the thrust washer 40 and inner front wear ring 34 are not touching each other.

Once the fluid passes through the thrust control valve 44 into the internal channel 124 of the shaft 18, the fluid is able to travel as flow B towards fluid return 42 and enters back into the primary fluid flow A as shown in FIG. 2.

When in use, the impeller/magnet subassembly rotates within casing 12 at a very high rate when activated by the outer magnet assembly 36 and hub motor 38. This rotating sub-assembly causes the fluid to rotate with the impeller within the inner volume 162 of the containment shell. The stator 24, when positioned behind the rotating sub-assembly reduces rotation of the fluid and converts the kinetic energy of the rotating fluid into potential energy that creates a higher pressure condition that contributes to a greater pressure differential between the inner volume 162 and fluid at the fluid return 42. A high differential pressure across the thrust control valve 44 facilitates control of the pressure within the inner volume 162. If the pressure is low at the entrance to the thrust control valve 44, then there is little change in flow and consequently little change in pressure when the opening of the thrust control valve widens. If opening and closing the thrust control valve 44 does not change the pressure in the inner volume 162 then there is no way the thrust control valve 44 can assist in balancing the thrust force.

The pressure differential in pump assembly 10 is further enhanced by a venturi effect that is created by the design and discharge direction provided by the fluid return 42. As fluid flow A passes over side openings 184, flow B is draw into flow A. This venturi effect lowers the pressure in passage 124, which helps to further increase the pressure differential across the thrust control valve 44. It is also important that the valve opening 44 is located directly adjacent to the inner volume 162 so that fluid accumulating in the inner volume is not required to travel through zones where it would be further rotated by the impeller. By minimizing the rotation of the fluid, the pressure gradient is also minimized and the maximum pressure differential is available at the valve.

Some known thrust balancing valves include a variable valve opening in the impeller hub and a separate opening at the fixed end of the shaft. In order for the fluid to flow from the fixed end of the shaft to the variable opening in the impeller hub in this configuration, the fluid must be ducted adjacent the rotating impeller using, for example, a set of grooves formed in the impeller that extend from the rear portion of the containment shell to the front oriented impeller hub. Since these channels are rotated as part of the impeller, a centrifugal force is created that acts on the fluid rotating in the channels. This centrifugal force results in a reduced pressure differential between the valve opening at the fixed end of the shaft and the variable valve in the impeller hub. This lower pressure differential limits an effective operating range over which the variable valve can control thrust forces in the pump assembly. By providing a thrust valve with a variable opening at the fixed end of the shaft and passing the fluid through a non-rotating member (that is, through a center channel of the shaft itself), the example pump assembly described above and shown in FIGS. 1–12 provides a significantly higher pressure differential and the ability to effectively operate over a much greater range of conditions for various pump applications.

Many different materials may be well suited for use in various features of the pump assembly 10. For example, the thrust ring, thrust washer, wear rings, shaft and bearings can be made from silicone carbide or other suitable wear resistant materials. Likewise, the containment shell and impeller may be coated with a wear resistant material such as silicone carbine.

The above specification, examples and data provide a complete description of the manufacture and use of the composition of the invention. Since many embodiments of the invention containment shell are made without departing from the spirit and scope of the invention, the invention resides in the claims hereinafter appended.

We claim:

1. A magnetically driven pump, comprising:
   a casing;
   a containment shell fixed to the casing;
   a shaft fixed to the containment shell hub;
   an impeller rotatable about the shaft within the casing;
   a magnetic coupling releasably coupled to the impeller and rotatable about the shaft;
   a rear bearing positioned between the impeller and the shaft; and
   a thrust control valve including a rear thrust ring positioned between the containment shell hub and the rear bearing, an opening of the thrust control valve being defined by a variable spacing between the thrust ring and the rear bearing.

2. The pump of claim 1, wherein the rear bearing is movable axially in direction along an axis of the shaft thereby changing a size of the thrust control valve opening.

3. The pump of claim 1, further comprising opposing inner and outer front wear rings positioned at a front portion of the impeller, and opposing inner and outer rear wear rings positioned at a rearward portion of the impeller.

4. The pump of claim 1, wherein the containment shell includes an open front end and a closed rear end, and the pump further comprises a stator that includes at least one radially extending vane and is positioned at the rear end of the containment shell to stabilize rotational flow created by rotation of the impeller and magnetic coupling relative to the containment shell.

5. The pump of claim 4, wherein the rear thrust ring is embedded in the stator.

6. The pump of claim 4, wherein the stator is removable from the containment shell.

7. The pump of claim 1, wherein the shaft includes an internal channel extending between and in fluid communication with the thrust control valve and the primary fluid flow in the impeller.

8. The pump of claim 3, wherein the inner front wear ring includes at least one locking tab and the impeller includes an inner front wear ring seat having at least one locking recess configured to engage the locking tab to releasably retain the inner front wear ring.

9. The pump of claim 1, wherein the containment shell includes an open end, a closed end, and an attachment flange extending radially from the open end of the containment shell, the attachment flange configured to be secured to the casing and including an outer rear wear ring retainer, and the pump further includes an outer rear wear ring releasably secured to the outer rear wear ring retainer without an intervening member and an inner rear wear ring releasably secured to the rear end of the impeller without an intervening member and in alignment wit the outer rear wear ring.

10. The pump of claim 9, wherein the casing includes an outer front wear ring retainer, and the pump further comprises outer and inner front wear rings, the outer front wear ring being releasably secured to the outer front wear ring retainer without an intervening member, and the inner front wear ring being releasably secured to the front end of impeller without an intervening member and in alignment with the outer front wear ring.

11. The pump of claim 10, wherein the wear rings include locking tabs configured to provide a twist lock mounting to the casing, containment shell or impeller.

12. The pump of claim 1, wherein the shaft includes an internal channel extending coaxially with an axis of the shaft, the internal channel in fluid communication with the thrust control valve and a primary fluid flow in the impeller.

13. A magnetically driven pump, comprising:
   a containment shell having a closed end, an open end, and defining an interior volume;
   a shaft secured to the closed end of the containment shell within the interior volume; and
   an impeller positioned at least partially within the containment shell;
   a first magnet coupled to the impeller and a second magnet positioned outside of the containment shell, wherein rotation of the second magnet causes rotation of the impeller about the shaft; and
   a stator secured at the closed end of the containment shell and including at least one vane extending into the interior volume in a generally radial direction from an axis of the shaft.

14. The pump of claim 13, wherein the stator is configured to be releasably secured to the containment shell.

15. The pump of claim 13, wherein the pump further includes a rear thrust ring secured to the stator.

16. The pump of claim 13, wherein the stator includes a plurality of radially extending vanes and an outer ring interconnecting the vanes.

17. The pump of claim 13, wherein the impeller includes a fluid channel defining a direction of primary flow through the pump and a shaft bare, the shaft bore being sized to receive rear bearings that facilitate rotation of the impeller about the shaft, the fluid channel being in fluid communication with an internal channel of the shaft.

18. The pump of claim 17, further comprising a fluid return configured for mounting to an end of the shaft and configured to direct fluid flow from the internal channel into the primary fluid flow and provide a venturi effect.

19. A method of balancing a magnetically driven pump that includes a containment shell having an open, and a hub, a shaft having an internal channel and being fixed of the containment hub, a magnetic coupling rotatable about the shaft within the containment shell, a rear bearing positioned between the magnetic coupling and the shaft and movable relative to the shaft, and a thrust control valve including a thrust ring adjacent to the containment shell hub and a valve opening having a size defined by a relative position between the rear bearing and the thrust ring, the method comprising the steps of:
  positioning the thrust control valve at the rear end of the containment shell between the containment shell hub and the rear bearing;
  increasing fluid pressure in the containment shell thereby moving the rear bearing axially away from the thrust ring to increase the size of the valve opening;
  moving fluid through the valve opening into the internal channel of the shaft thereby decreasing pressure in the containment shell; and
  moving the rear bearing axially toward the thrust ring as the pressure in the containment shell decreases.

20. The method of claim 19, wherein the impeller includes a fluid channel for primary fluid flow through the pump, and the method further comprises moving the fluid in the internal channel of the shaft into the primary fluid flow.

21. The method of claim 19, wherein the rear bearing is positioned at the rear end of the containment shell, the method further comprising extending the rear bearing rearward of the magnet assembly whereby the only the rear bearing contacts the thrust ring to define the thrust control valve.

22. A magnetically driven pump, comprising:
  a casing;
  a containment shell fixed to the casing;
  a shaft fixed to the containment shell;
  an impeller rotatable about the shaft within the casing;
  a magnetic coupling releasably coupled to the impeller and rotatable about the shaft;
  a rear bearing positioned between the impeller and the shaft; and
  a thrust control valve defined between the containment shell and the rear bearing, an opening of the thrust control valve being defined by a variable spacing between the thrust ring and the rear bearing;
  inner and outer rear wear rings positioned between the impeller and the containment shell with the inner rear wear ring mounted to the impeller and the outer rear wear ring mounted to the containment shell, wherein the rear wear rings are arranged radially relative to each other, and the rear wear rings are configured to restrict fluid flow between the wear rings.

23. The pump of claim 22, further comprising inner and outer front wear rings positioned between the impeller and the casing with the inner front wear ring mounted to the impeller and the outer front wear ring mounted to the casing, wherein the front wear rings are arranged radially relative to each other.

* * * * *

UNITED STATES PATENT AND TRADEMARK OFFICE
CERTIFICATE OF CORRECTION

| | | |
|---|---|---|
| PATENT NO. | : 7,101,158 B2 | Page 1 of 1 |
| APPLICATION NO. | : 10/751259 | |
| DATED | : September 5, 2006 | |
| INVENTOR(S) | : Hembree et al. | |

It is certified that error appears in the above-identified patent and that said Letters Patent is hereby corrected as shown below:

Col. 7, line 51, claim 1: "the casing;" should read --the casing, the containment shell having a hub;--

Col. 8, line 32, claim 9: "alignment wit the" should read --alignment with the--

Col. 9, line 6, claim 17: "a shaft bare," should read --a shaft bore,--

Col. 9, line 15, claim 19: "an open, and a hub," should read --an open front end, a closed rear end, and a hub,--

Col. 9, line 16, claim 19: "being fixed of the" should read --being fixed to the--

Col. 9, line 17, claim 19: "containment hub," should read --containment shell hub,--

Col. 9, line 26, claim 19: "shell between" should read --shell hub between--

Signed and Sealed this

Twenty-seventh Day of March, 2007

JON W. DUDAS
*Director of the United States Patent and Trademark Office*